April 18, 1939.  H. M. THIELE  2,155,105
INNER TUBE FOR PNEUMATIC TIRES
Filed April 11, 1938
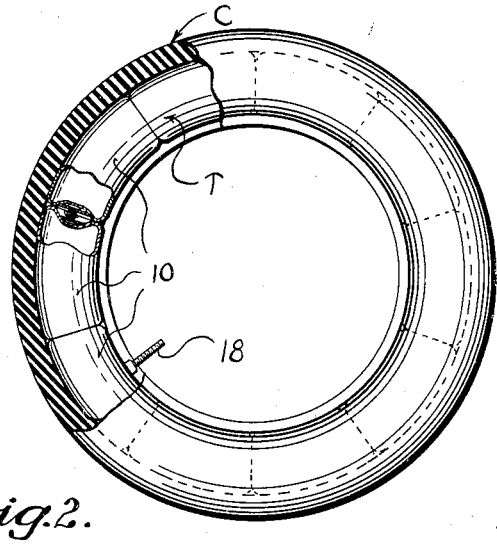
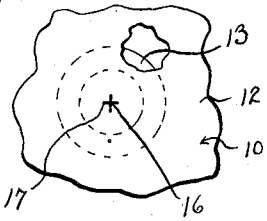
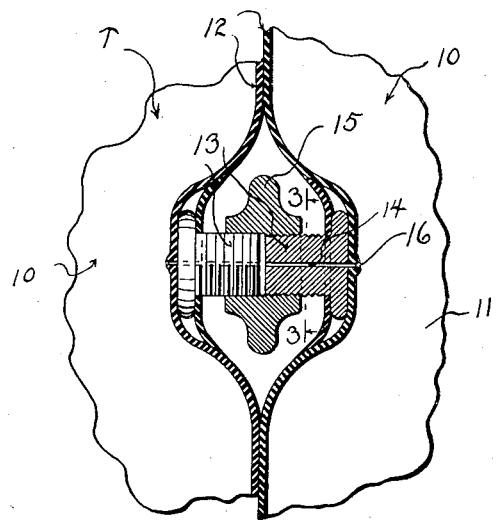
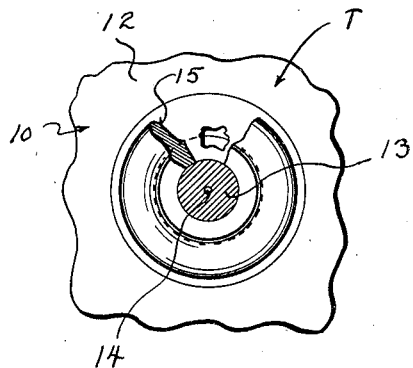
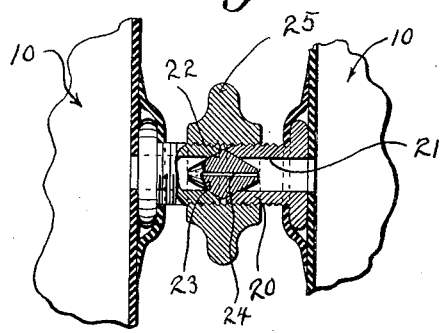
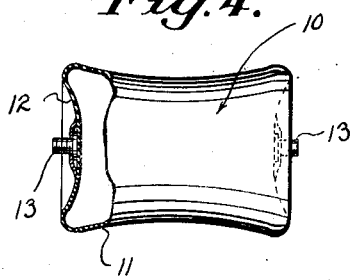
Inventor.
Helmuth M. Thiele
By Young Young
Attorneys.

Patented Apr. 18, 1939

2,155,105

UNITED STATES PATENT OFFICE 2,155,105

INNER TUBE FOR PNEUMATIC TIRES

Helmuth M. Thiele, Milwaukee, Wis.

Application April 11, 1938, Serial No. 201,361

1 Claim. (Cl. 152—333)

This invention appertains to pneumatic tires for motor and like vehicles, and more particularly to a novel inner tube for tire casings.

One of the primary objects of my invention is to provide an inner tube embodying a plurality of inflatable sections, with novel means for connecting one section with the other, whereby all of the sections can be inflated from a common source, the construction being such that if one section becomes defective through any cause, such as a puncture or blow-out, the entire tire will be prevented from immediately collapsing, so that the vehicle can be brought safely to a slow speed without danger to the vehicle or its occupants.

Another salient object of my invention is to provide a pneumatic tire having an inner tube including a plurality of independent sections, with one of the sections carrying an ordinary tire inflation valve, each of the sections being provided with coupling members having restricted orifices, so that in case of a puncture or blow-out in any one of the sections, the air will be released slowly from the other sections, and thus prevent the sudden collapse of a tire and the danger contingent therewith.

With these and other objects in view, the invention consists in the novel construction, arrangement, and formation of parts, as will be hereinafter more specifically described, claimed, and illustrated in the accompanying drawing, in which drawing:

Figure 1 is a side elevational view of a pneumatic tire, with parts thereof broken away and in section to illustrate the novel arrangement of my inner tube.

Figure 2 is an enlarged, fragmentary sectional view showing the novel means employed for connecting a pair of the sections of the inner tube together.

Figure 3 is an enlarged, fragmentary, detail sectional view taken substantially on the line 3—3 of Figure 2, looking in the direction of the arrows.

Figure 4 is a detail, side elevational view of one of the sections before the inflation thereof, parts thereof being shown broken away and in section.

Figure 5 is a view similar to Figure 2, illustrating a modified form of means for connecting a pair of the sections of the inner tube together.

Figure 6 is a fragmentary, detail sectional view showing the air-filling and escape vent formed in each section.

Referring to the drawing in detail, wherein similar reference characters designate corresponding parts throughout the several views, the letter C generally indicates a tire casing for receiving my novel inner tube T.

The tire casing C is of the usual or any preferred construction, and the inner tube is introduced therein in its deflated condition in the customary manner.

My improved inner tube T comprises a plurality of like sections 10, each of which is formed from live resilient rubber, so that the same can be expanded upon the introduction of compressed air into the same. As illustrated, each section 10 includes a cylindrical side wall 11 and end walls 12. The side wall 11 is preferably tapered toward its transverse center, as I have found by this shape the sections will readily conform to the curvature both transversely and longitudinally of the tire casing C.

Each end wall 12 has securely anchored therein a threaded nipple 13, which protrudes outwardly from said end wall. The threaded nipple 13 is provided with a centrally disposed, longitudinally extending bore 14. This bore is formed relatively fine so that a restricted passageway will be provided. This will prevent the undue rapid flowing of the air from one section to the other.

The threaded nipples 13 of one section are adapted to be connected to the threaded nipples of adjacent sections by the use of a nut 15, and the nut is adapted to draw the nipples into intimate contact. If desired, a washer can be placed between the nipples, so as to insure a fluid-tight joint.

The restricted bore 14 of each nipple communicates with the interior of its section by means of a small opening 16 formed in the end wall of the section. This opening 16 can be formed by slitting the rubber of the end wall in a cross-shape, as indicated by the reference character 17 in Figure 6 of the drawing.

Other means can be provided for connecting the sections together, and in Figure 5 I have illustrated one modified form of means. In this form, I have shown the sections 10 provided with nipples 20, and these nipples have bores 21 of relatively great size in diameter. The outer ends of the bores of the nipples are tapered to form seats 22. A double-ended cone coupling member 23 is adapted to be placed between the nipples 20 and to fit on the seats 22. This coupling member has formed therein a restricted bore 24, so that the flow of air therethrough will be comparatively slow. The nipples 20 are firmly connected together by means of a turnbuckle nut 25, and by turning the nut the nipples are brought together and in firm contact with the tapered faces of the double cone-shaped coupling member 23.

In use of my improved inner tube, the sections are all connected together by the nipples, so that a circular tube will be had. One of the sections is provided with a tire inflation valve 18, and after the tire is placed on the wheel, the inner tube is inflated through the inflation valve 18. The air under compression flowing into the section carrying the valve 18 will gradually flow from one section to the other until all of the sections are under the desired pressure.

The tire is used in the ordinary manner, and should one section become defective through any cause, the air will slowly escape from one section to the other until it reaches the defective section. By this time, the driver of the vehicle equipped with my inner tube will be enabled to bring the vehicle down to a safe speed or stop without injury to the vehicle or the occupants thereof.

Changes in details may be made without departing from the spirit or the scope of my invention, but what I claim as new is:

In a pneumatic tire, an inner tube comprising, a plurality of independent companion sections, one of said sections being provided with an air inflation valve, each of said sections including end walls and outwardly extending nipples carried by said end walls, means detachably connecting the nipples of adjacent sections together, and said nipples being provided with restricted air passageways.

HELMUTH M. THIELE.